United States Patent
Lin et al.

(10) Patent No.: US 9,825,783 B1
(45) Date of Patent: Nov. 21, 2017

(54) METHOD AND CIRCUIT FOR ESTIMATING CHANNEL STATE AND ASSOCIATED RECEIVER

(71) Applicant: MStar Semiconductor, Inc., Hsinchu, Hsien (TW)

(72) Inventors: Chih-Hsun Lin, Hsinchu County (TW); Chih-Cheng Kuo, Hsinchu County (TW); Tai-Lai Tung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/459,535

(22) Filed: Mar. 15, 2017

(30) Foreign Application Priority Data

Nov. 15, 2016 (TW) .............................. 105137221 A

(51) Int. Cl.
*H04L 27/28* (2006.01)
*H04L 25/02* (2006.01)
*H04L 7/033* (2006.01)
*H04L 1/00* (2006.01)

(52) U.S. Cl.
CPC ........ *H04L 25/0204* (2013.01); *H04L 1/0052* (2013.01); *H04L 7/033* (2013.01); *H04L 25/0224* (2013.01)

(58) Field of Classification Search
CPC . H04L 25/0204; H04L 25/0224; H04L 7/033; H04L 1/0052
See application file for complete search history.

(56) References Cited

U.S. PATENT DOCUMENTS

| 8,351,526 B2* | 1/2013 | Butussi | H04L 25/0232 |
| | | | 375/259 |
| 2006/0193206 A1* | 8/2006 | Alinat | G01S 7/527 |
| | | | 367/88 |
| 2008/0112479 A1* | 5/2008 | Garmany | H04B 7/005 |
| | | | 375/231 |
| 2010/0303175 A1* | 12/2010 | Pirot | H04L 25/0212 |
| | | | 375/340 |

* cited by examiner

*Primary Examiner* — Dac Ha
(74) *Attorney, Agent, or Firm* — WPAT, PC

(57) ABSTRACT

A method for estimating a channel state of an audio/video signal includes: estimating a first response and a second response according to the audio/video signal, wherein the first response corresponds to an echo path and the second response corresponds to a reference path; calculating a plurality of phase differences at a plurality of time points between the first response and the second response; determining whether the echo path is a Doppler path according to the phase differences; and when it is determined that the echo path is the Doppler path, calculating a phase rotation frequency of the Doppler path according to a difference between at least two of the phase differences.

21 Claims, 6 Drawing Sheets

US 9,825,783 B1

METHOD AND CIRCUIT FOR ESTIMATING CHANNEL STATE AND ASSOCIATED RECEIVER

This application claims the benefit of Taiwan application Serial No. 105137221, filed Nov. 15, 2016, the subject matter of which is incorporated herein by reference.

BACKGROUND OF THE INVENTION

Field of the Invention

The invention relates in general to a channel estimation method, and more particularly to a channel estimation method applied to a digital television.

Description of the Related Art

A multipath corresponding to signal transmission includes a main path and multiple echo paths. Sometimes one or multiple Doppler paths may be included in the echo paths. The phase of a signal transmitted through a Doppler path has a rotation frequency (Doppler frequency). Because signals transmitted from different paths may apply different suitable processing methods, a receiver usually includes a channel estimation circuit, which estimates multiple paths of signals received and determines whether a Doppler path exists in the multiple paths. If so, a Doppler frequency corresponding to the Doppler path is calculated according to signal components corresponding to the Doppler path for further use of a subsequent equalizer or for settings of an error correcting circuit. However, due to possible changes in strengths of the signal components corresponding to the Doppler path as well as noises and other non-ideal factors, it is extremely challenging for a conventional solution to precisely calculate the above Doppler frequency, in a way that subsequent signal processing may not yield an optimum result.

SUMMARY OF THE INVENTION

It is an object of the present invention to provide a channel estimation method capable of accurately calculating a Doppler frequency to solve issues of the prior art.

A method for estimating a channel state of an audio/video signal is disclosed according to an embodiment of the present invention. The method includes: estimating a first response and a second response according to the audio/video signal, wherein the first response corresponds to an echo path and the second response corresponds to a reference path; calculating a plurality of phase differences at a plurality of time points between the first response and the second response; determining whether the echo path is a Doppler path according to the phase differences; and when it is determined that the echo path is the Doppler path, calculating a phase rotation frequency corresponding to the Doppler path according to a difference between at least two of the phase differences.

A circuit for estimating a channel state of an audio/video signal is disclosed according to another embodiment of the present invention. The circuit includes a channel estimating circuit and a Doppler path detecting circuit. The channel estimating circuit estimates a first response and a second response according to the audio/video signal, wherein the first response corresponds to an echo path and the second response corresponds to a reference path. The Doppler path detecting circuit calculates a plurality of phase differences at a plurality of time points between the first response and the second response, and determines whether the echo path is a Doppler path according to the phase differences. When the it is determined that the echo path is the Doppler path, the Doppler path detecting circuit calculates a phase rotation frequency corresponding to the Doppler path according to a difference between at least two of the phase differences.

A receiver for processing an audio/video signal according to a channel state of the audio/video signal is disclosed according to another embodiment of the present invention. The receiver includes an estimating circuit, an equalizer and an error correcting circuit. The estimating circuit estimates an echo path and a reference path. When the echo path is a Doppler path, the estimating circuit calculates a phase rotation frequency corresponding to the Doppler path according to a difference between phase differences at two time points between the echo path and the reference path, and generates a set of setting signals. The equalizer processes the audio/video signal according to the set of setting signals to generate an equalized signal. The error correcting circuit performs error correction on the equalized signal according to the set of setting signals.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
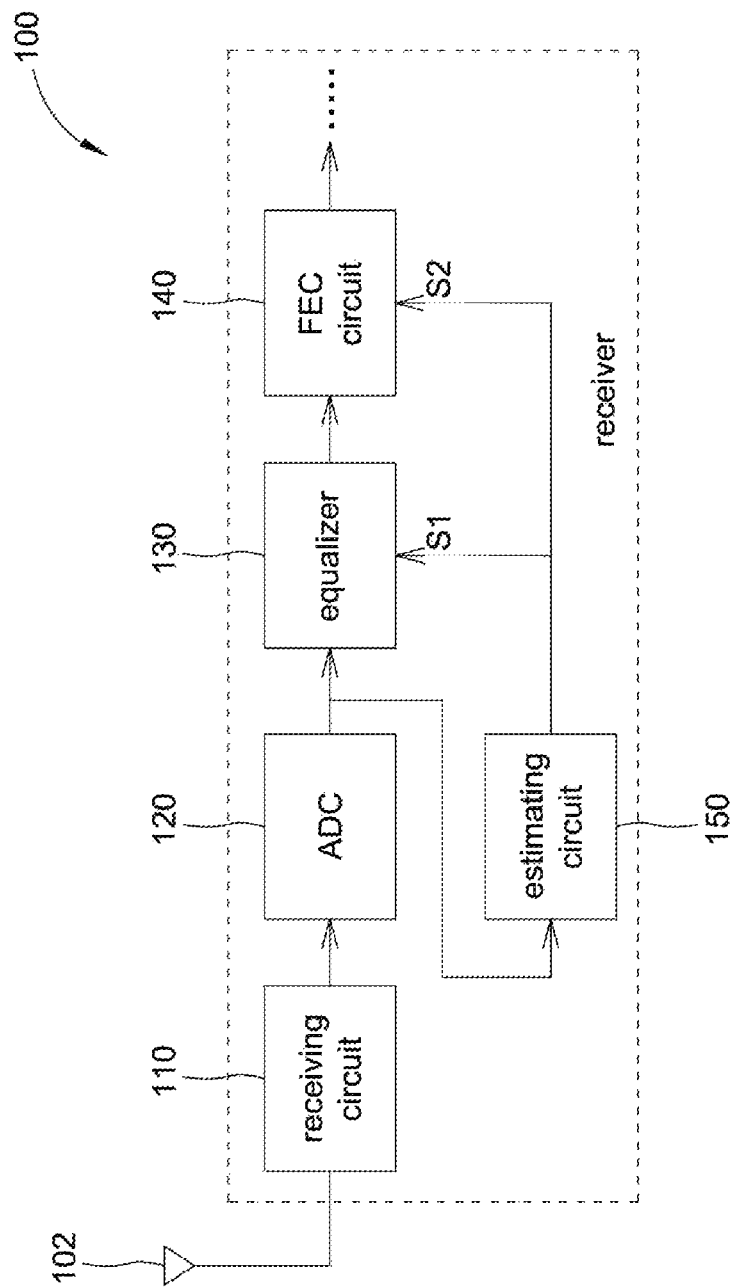
FIG. 1A is a block diagram of a receiver according to an embodiment of the present invention.

FIG. 1A is a block diagram of a receiver 100 according to an embodiment of the present invention. In the embodiment, the receiver 100, disposed in a digital television, receives an audio/video signal from an antenna 102, performs a preliminary process on the audio/video signal, and transmits the preliminarily processed audio/video signal for subsequent processing for display and playback. Further, the receiver 100 of the embodiment is compliant with the Advanced Television Systems Committee (ATSC) standard.

As shown in FIG. 1A, the receiver 100 includes a receiving circuit 110, an analog-to-digital converter (ADC) 120, an equalizer 130, a forward error correction (FEC) circuit 140 and an estimating circuit 150. The receiving circuit 110 receives an audio/video signal from the antenna 102, and performs operations such as filtering and gain adjustment on the audio/video signal to output an analog audio/video signal. The ADC 120 converts the analog audio/video signal to a digital audio/video signal. The equalizer 130 performs equalization on a channel response of the digital audio/video signal to generate an equalized audio/video signal. The FEC circuit 140 performs error correction on the equalized audio/video signal to generate a corrected audio/video signal to reduce a bit error rate (BER). The estimating circuit 150 estimates a channel state of the digital audio/video signal to generate setting signals S1 and S2 for the equalizer 130 and the FEC circuit 140 to accordingly perform parameter setting. Thus, the equalize 130 and the FEC circuit 140 may have more outstanding track abilities. Further, the receiver 100 transmits the corrected audio/video signal to a subsequent circuit, e.g., a decoder, to perform subsequent operations.

Figure 1B:
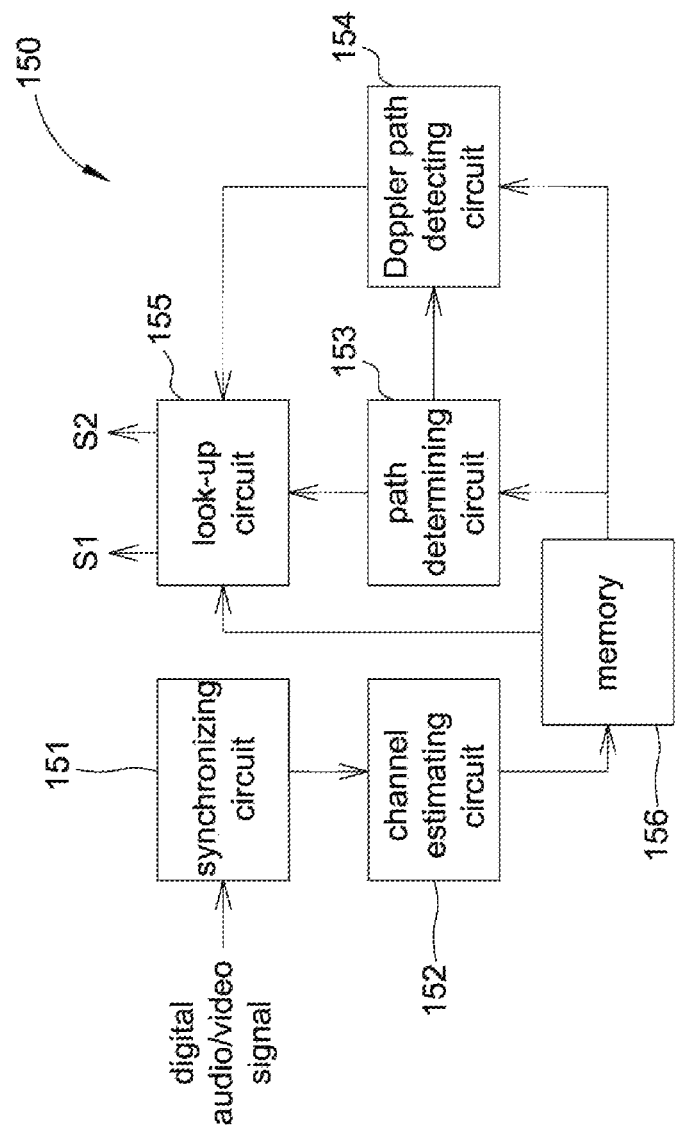
FIG. 1B is a block diagram of an estimating circuit in a receiver according to an embodiment of the present invention.

FIG. 1B shows a block diagram of the estimating circuit 150 in the receiver 100 according to an embodiment of the present invention. As shown in FIG. 1B, the estimating circuit 150 includes a synchronizing circuit 151, a channel estimating circuit 152, a path determining circuit 153, a Doppler path detecting circuit 154, a look-up circuit 155 and a memory 156. The synchronizing circuit 151 determines a position of a data part in the digital audio/video signal according to the digital audio/video signal to generate synchronization information. More specifically, the digital audio/video signal includes multiple signal frames, whose data format includes a header part and a data part. The header part includes a plurality of cyclic sequences and frame information, e.g., a starting position of the data part. The data part includes real audio/video contents. The synchronizing circuit 151 may determine the position of the header according to the cyclic sequences, and obtain the position of the data part in the signal frames according to the frame information included in the header. The channel estimating circuit 152 performs channel estimation on the data part according to the synchronization information to obtain responses and time information corresponding to a plurality of paths, and stores the responses and time information to the memory 156. The path determining circuit 153 reads the responses and time information of the paths from the memory 156 to determine a main path and a plurality of echo paths, and accordingly generates a determination result. More specifically, in one embodiment, the path determining circuit 153 determines a path corresponding to a response that is higher than a predetermined strength as a main path. The Doppler path detecting circuit 154 detects a Doppler path included in the paths according to the responses and time information of the paths and the determination result to generate a detection result. The detection result further includes a phase rotation frequency of the response corresponding to the Doppler path. The look-up circuit 155 looks up a look-up table (LUT) (not shown) according to the detection result to generate the setting signals S1 and S2. In another embodiment, the channel estimating circuit 152, the path determining circuit 153, the Doppler path detecting circuit 154 and the look-up circuit 155 may be implemented by software, and the memory 156 may be outside the estimating circuit 150. Further, the look-up table 155 may utilize an LUT that is stored in the memory 156 or located outside the estimating circuit 150 when performing the look-up process. The path determining circuit 153 and the Doppler path determining circuit 154 may store the determination result and detection result back to the memory 156, respectively. Thus, the Doppler path detecting circuit 154 and the look-up circuit 155 may directly read the determination result and detection result from the memory 156, respectively, to perform associated operations.

The main feature of the present invention lies in the estimating circuit 150. Therefore, details of the estimating circuit 150 are given in the description below, and details of the remaining elements are omitted herein.

Figure 2:
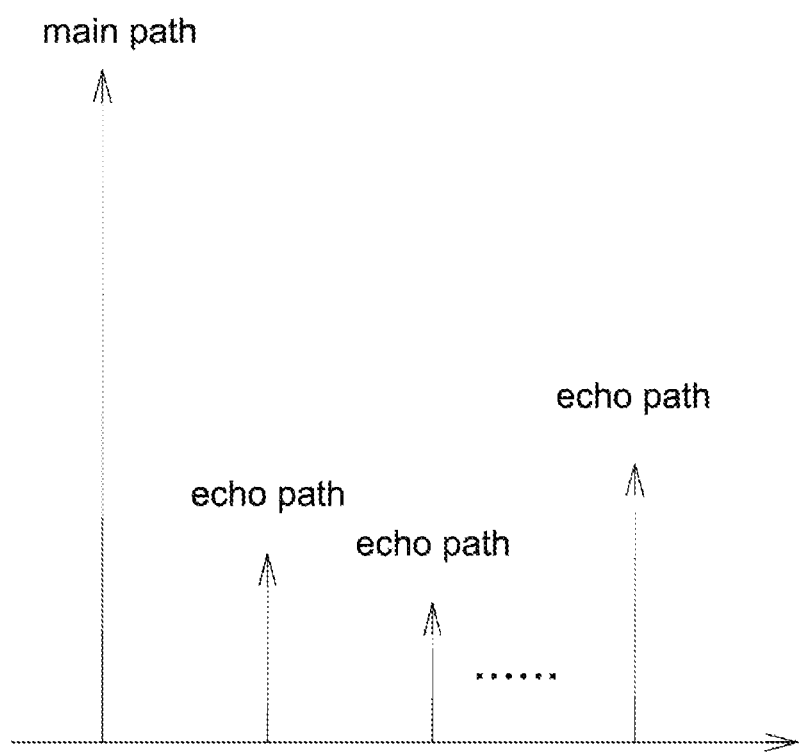
FIG. 2 is a schematic diagram of a main path and echo paths.

An audio/video signal of a digital television includes multiple signal frames, whose data format includes a header part and a data part, as previously described. Further, the audio/video signal received by the receiver 100 and an original signal transmitted from a transmitter have a relationship: Y=X*h+N, where Y is the audio/video signal received by the receiver 100, X is the original signal transmitted by the transmitter, h is a channel response, and N is a noise. The synchronizing circuit 151 in the channel estimating circuit 150 first generates synchronization information including positions of the header part and the data part in the signal frame according to the digital audio/video signal received. The channel estimating circuit 152 estimates conditions of a channel response of each of the signal frames according to contents of the data part. FIG. 2 shows conditions of a channel response of a signal frame, including responses of a main path and multiple echo paths. The strength of the response corresponding to the main path is usually greater than those of the responses corresponding to other echo paths. The path determining circuit 153 may determine which path is the main path according to a predetermined strength (e.g., a path having a strength greater than a threshold), and determine the remaining paths as the echo paths.

In general, the phase of a response does not change. However, when an echo path is a Doppler path, the response corresponding to the echo path has a phase rotation frequency, i.e., a Doppler frequency. In the embodiment, the Doppler path detecting circuit 154 may determine which echo path is a Doppler path, and is capable of accurately determining the phase rotation frequency of the corresponding response.

To keep the illustrations simple in the description below, the Doppler path detecting circuit 154 operates on only one echo path, and the channel estimating circuit 152 has estimated the channel response of the $(n+k)^{th}$ signal frame and stored the estimated channel response in the memory 156.

Referring to FIG. 3, the main path has a response $\vec{A}=(a_1,a_2)$, and the echo path has a response $\vec{B}=(b_1,b_2)$. When the response of the echo path has the phase rotation frequency, the response of the echo path has different vector values for different signal frames; that is, $\vec{B}=(b_{1n},b_{2n})$ for the $n^{th}$ signal frame, $\vec{B}=(b_{1(n+1)},b_{2(n+1)})$ for the $(n+1)^{th}$ signal frame, . . . , and $\vec{B}=(b_{1(n+k)},b_{2(n+k)})$ for the $(n+k)^{th}$ signal frame. Further, as the phase of the response of the main path does not substantially change, the phase of the responses of the main path of different signal paths $\vec{A}=(a_{1n},a_{2n})$, $\vec{A}=(a_{1(n+1)},a_{2(n+1)})$ and $\vec{A}=(a_{1(n+k)},a_{2(n+k)})$ shown does not substantially change. In an operation of the Doppler path detecting circuit 154, the Doppler path detecting circuit 154 first calculates multiple phase differences $\theta_n$, $\theta_{n+1}$, . . . and $\theta_{n+k}$ of the responses corresponding to the echo path and the main path for different signal frames. In the embodiment, the Doppler path detecting circuit 154 calculates the cosine values of multiple phase differences $\theta_n$, $\theta_{n+1}$, . . . and $\theta_{n+k}$ for a subsequence calculation. For example, the cosine value of the phase difference $\theta_n$ may be obtained through an equation:

$$\cos\theta_n = \frac{\langle \vec{A},\vec{B} \rangle}{|\vec{A}||\vec{B}|} = \frac{a_{1n}*b_{1n}+a_{2n}*b_{2n}}{\sqrt{a_{1n}^2+a_{2n}^2}\sqrt{b_{1n}^2+b_{2n}^2}}.$$

Next, the Doppler path detecting circuit 154 may determine whether the echo path is a Doppler path according to three conditions below: (1) for two phase differences respectively corresponding to two adjacent signal frames among the $n^{th}$ to $(n+k)^{th}$ signal frames of the audio/video signal, calculating a difference between the two phase differences to accordingly obtain multiple differences, and determining whether a sum of the differences is greater than a first threshold to generate a first determination result, i.e., determining whether $\Sigma_{i=2}^{k}|\cos\theta_{n+1}-\cos\theta_{n+i-1}|>TH1$, where "TH1" is the first threshold; (2) for two phase differences respectively corresponding to the $1^{st}$ frame and the last frame (i.e., the $n^{th}$ and $(n+k)^{th}$ signal frames) of the received signal, calculating a difference between the two phase differences, and determining whether the difference is greater than a second threshold to generate a second determination result, i.e., determining whether $|\cos t\theta_{n+k}-\cos\theta_n>TH2$, where "TH2" is the second threshold; and (3) counting the number of times of a change in a phase rotation direction according to multiple phase differences, and determining that the number of times of the change in the phase rotation direction is smaller than a third threshold; for example, if $\theta_{n+1}$ is greater than $\theta_n$ (i.e., $\theta_{n+1}-\theta_n>1$) but $\theta_{n+2}$ is smaller than $\theta_{n+1}$ (i.e., $\theta_{n+2}-\theta_{n+1}<0$), it means that the change in the phase rotation direction occurs once. In the embodiment, when all of the three conditions above are satisfied, the Doppler path detecting circuit 154 determines that the echo path is a Doppler path. That is, when any of the three conditions is not satisfied, the Doppler path detecting circuit 154 determines that the echo path is not a Doppler path.

Next, if the Doppler path detecting circuit 154 determines that the echo path is a Doppler path, the phase rotation frequency (the Doppler frequency) of the echo path may be determined according to the multiple phase differences calculated or the cosine values of the multiple phase differences calculated above. For example but not limited to, a phase ration angle $\theta_r$ of the response of the echo path within the time of one signal frame may be obtained according to a difference between $\theta_{n+1}$ and $\theta_n$; i.e., $\theta_r=\theta_{n+1}-\theta_n$, and the phase rotation frequency may be obtained through an equation $\theta_r=2\pi f\Delta t$, where $\Delta t$ is the time of one signal frame and "f" is the phase rotation frequency.

The look-up circuit 155 looks up an LUT according to the phase rotation frequency of the echo path calculated to generate the setting signals S1 and S2 to the equalizer 130 and the FEC circuit 140, so as to enable the equalizer 130 and the FEC circuit 140 to accordingly adjust respective internal settings to achieve optimum track abilities.

It should be noted that, the main path in the above embodiment may be replaced by another reference path whose phase does not substantially change, e.g., another echo path. That is to say, the Doppler path detecting circuit 154 may calculate multiple phase differences between the responses corresponding to the echo path and the reference path to accordingly determine whether the echo path is a Doppler path and calculate the phase rotation frequency of the echo path. These variations are encompassed within the scope of the present invention.

Figure 3A:
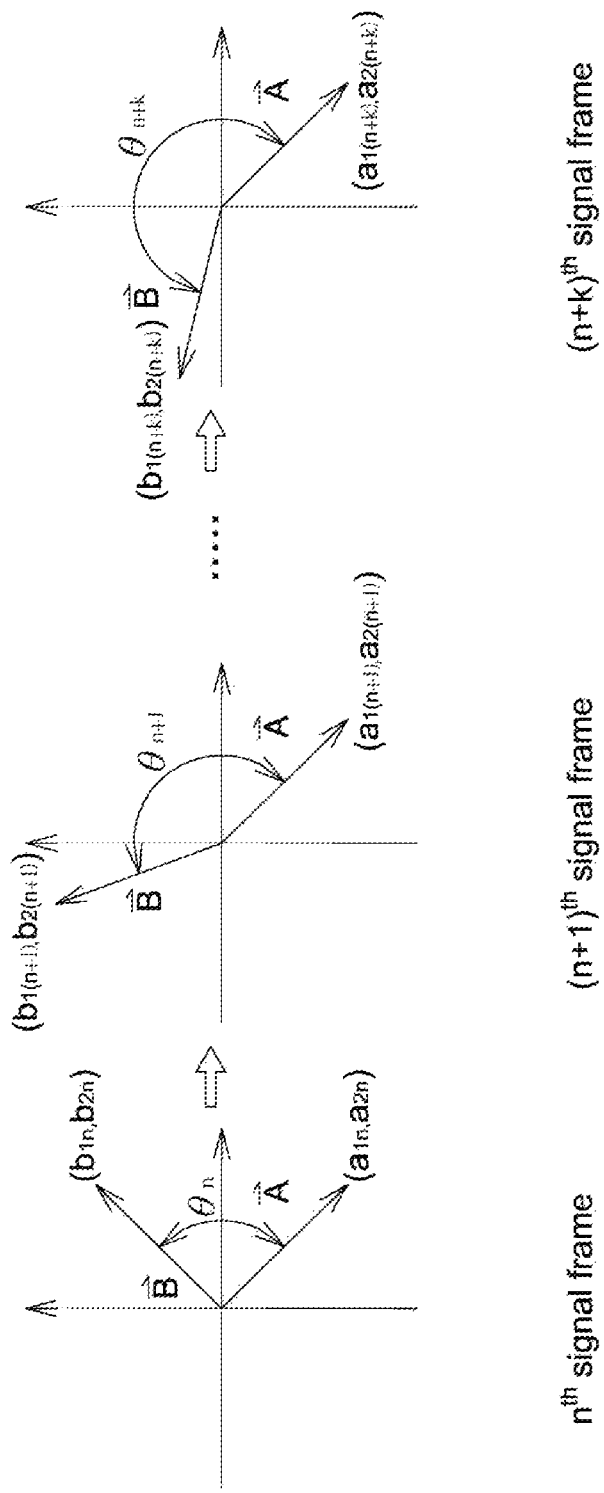
FIG. 3A is a schematic diagram of vector values and a phase difference of a main path and an echo path in different signal frames.
Figure 3B:
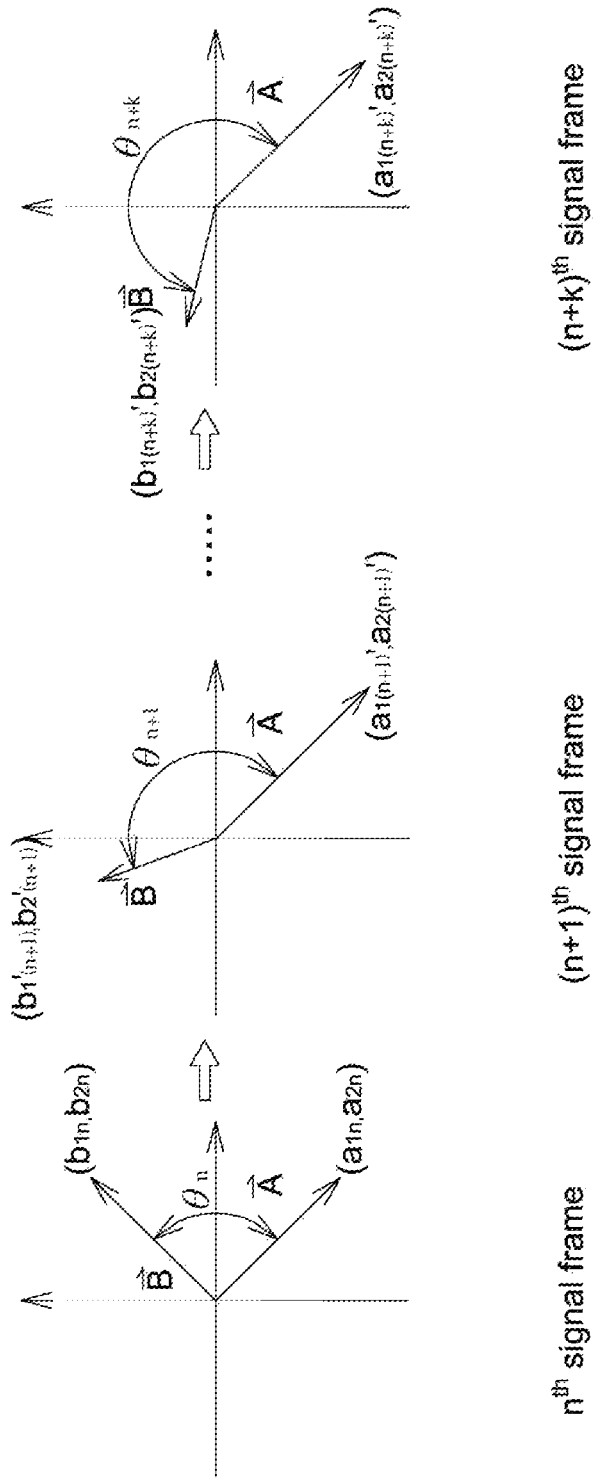
FIG. 3B is a schematic diagram illustrating an unchanged phase relationship between a main path and an echo path in the event of a change in the strength of signal frames.

Through the embodiment in FIG. 3A and the above description, the determination of the Doppler path and the phase rotation frequency of the Doppler path in the embodiment are determined according to multiple phase differences of responses corresponding to the echo path and the main path. In the event of a change in the strength of signal components of the main path or the echo path, because the phase differences are not affected, the determination and calculation results are be prevented from effects of the change in the signal strength and may remain accurate. More specifically, FIG. 3 B shows a schematic diagram of a change in the strength between the $(n+1)^{th}$ to the $(n+k)^{th}$ signal frames. In FIG. 3B, in the $(n+1)^{th}$ signal frame, $\bar{A}=(a_{1(n+1)}',a_{2(n+1)}')$ and $\bar{B}=(b_{1(n+1)}',b_{2(n+1)}';\ldots$; in the $(n+k)^{th}$ signal frame, $\bar{A}=(a_{1(n+k)}',a_{2(n+k)}')$ and $\bar{B}=(b_{1(n+k)}',b_{2(n+k)}')$. Meanwhile, comparing FIG. 3A and FIG. 3B, as the angle is not affected although there are changes in the strength in the responses $\bar{A}=(a_1,a_2)$ and $\bar{B}=(b_1,b_2)$ corresponding to the main path and the echo path, the determination for the Doppler path and the calculation for the phase rotation frequency of the Doppler path in the embodiment are more accurate.

Figure 4:
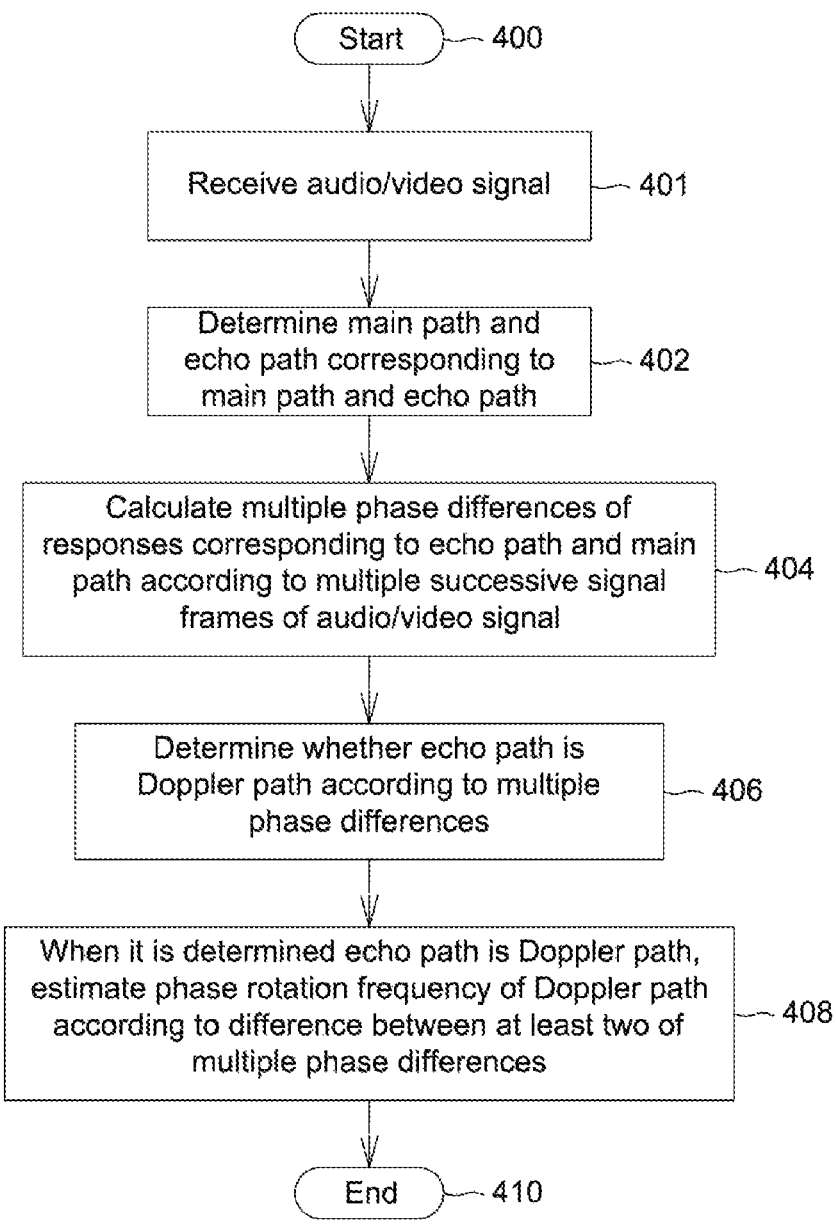
FIG. 4 is a flowchart of a channel estimation method according to an embodiment of the present invention.

FIG. 4 shows a flowchart of a channel estimation method according to an embodiment of the present invention. Referring to the above description, the process in FIG. 4 is as below.

In step 400, the process begins.

In step 401, an audio/video signal is received.

In step 402, a main path and an echo path corresponding to the audio/video signal are determined.

In step 404, multiple phase differences of responses corresponding to the main path and the echo path corresponding to the successive signal frames of the audio/video signal are calculated.

In step 406, it is determined whether the echo path is a Doppler path according to the multiple phase differences.

In step 408, when it is determined that the echo path is the Doppler path, a phase rotation frequency of the Doppler path is estimated according to a difference between at least two of the multiple phase differences.

In step 410, the process ends.

In conclusion, in the channel estimation method according to an embodiment of the present invention, multiple phase differences of responses corresponding to the echo path and the main path are calculated, whether the echo path is a Doppler path is determined according to the multiple phase differences, and the phase rotation frequency is determined according to a difference between at least two of the multiple phase differences. Even if a change occurs in the strength of signal components on any of the paths, the phase difference is not affected. Therefore, through the channel estimation method of the present invention, the determination and calculation results may stay accurate to provide a subsequent circuit with better settings according to the phase rotation frequency.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for estimating a channel state of an audio/video signal, comprising:

estimating a first response and a second response according to the audio/video signal, wherein the first response corresponds to an echo path and the second response corresponds to a reference path;

calculating a plurality of phase differences between the first response and the second response at a plurality of time points;

determining whether the echo path is a Doppler path according to the phase differences; and when it is determined that the echo path is the Doppler path, calculating a phase rotation frequency corresponding to the Doppler path according to a difference between at least two of the phase differences.

2. The method according to claim 1, wherein the reference path is a main path.

3. The method according to claim 1, wherein the step of calculating the phase differences between the first response and the second response at the time points comprises:

calculating the phase differences of the first response and the second response according to a plurality of signal frames of the audio/video signal, respectively, wherein the signal frames correspond to the time points, respectively.

4. The method according to claim 3, further comprising:

calculating a difference between every two of the phase differences to obtain a plurality of differences;

calculating a sum of the differences; and determining whether the sum is greater than a first threshold to generate a first determination result;

wherein, the step of determining whether the echo path is the Doppler path according to the phase differences is performed according to the first determination result.

5. The method according to claim 4, wherein the step of determining whether the echo path is the Doppler path according to the phase differences comprises:

determining that the echo path is not the Doppler path when the first determination result indicates that the sum of the differences is smaller than the first threshold.

6. The method according to claim 3, further comprising:

among the phase differences, calculating a difference between two phase differences respectively corresponding to the first signal frame and the last signal frame among the signal frames; and determining whether the difference is greater than a second threshold to generate a second determination result;

wherein, the step of determining whether the echo path is the Doppler path is performed according to the second determination result.

7. The method according to claim 6, wherein the step of determining whether the echo path is the Doppler path according to the phase differences comprises:

determining that the echo path is not the Doppler path when the second determination result indicates that the difference is smaller than the second threshold.

8. The method according to claim 3, further comprising:

calculating a difference between every two of the phase differences to obtain a plurality of differences; and calculating the differences to obtain the number of times of a change in a phase rotation direction;

wherein, the step of determining whether the echo path is the Doppler path is performed according to the number of times of the change in the phase rotation direction.

9. The method according to claim 8, wherein the step of determining whether the echo path is the Doppler path according to the phase differences comprises:

determining that the echo path is not the Doppler path when the number of times of the change in the phase rotation direction is greater than a third threshold.

10. A circuit for estimating a channel state of an audio/video signal, comprising:

a channel estimating circuit, estimating a first response and a second response according to the audio/video signal, wherein the first response corresponds to an echo path and the second response corresponds to a reference path; and a Doppler path detecting circuit, calculating a plurality of phase differences between the first response and the second response at a plurality of time points, determining whether the echo path is a Doppler path according to the phase differences, and calculating a phase rotation frequency corresponding to the Doppler path according to a difference between at least two of the phase differences when it is determined that the echo path is the Doppler path.

11. The circuit according to claim 10, wherein the reference path is a main path.

12. The circuit according to claim 10, wherein the Doppler path detecting circuit calculates the phase differences of the first response and the second response according to a plurality of signal frames of the audio/video signal, respectively, and the signal frames correspond to the time points, respectively.

13. The circuit according to claim 12, wherein for two phase differences respectively corresponding to two adjacent signal frames among a plurality of successive signal frames of the audio/video signal, the Doppler path detecting circuit calculates a difference between every two of the phase differences to obtain a plurality of differences, calculates a sum of the differences, and determines whether the sum is greater than a first threshold to generate a first determination result; the Doppler path detecting circuit determines whether the echo path is the Doppler path according to the first determination result.

14. The circuit according to claim 13, wherein the Doppler path detecting circuit determines that the echo path is not the Doppler path when the first determination result indicates that the sum of the differences is smaller than the first threshold.

15. The circuit according to claim 12, wherein, among the phase differences, the Doppler path detecting circuit calculates a difference between two phase differences respectively corresponding to the first signal frame and the last signal frame among the signal frames, and determines whether the difference is greater than a second threshold to generate a second determination result; the Doppler path detecting circuit determines whether the echo path is the Doppler path according to the second determination result.

16. The circuit according to claim 15, wherein the Doppler path detecting circuit determines that the echo path is not the Doppler path when the second determination result indicates that the difference is smaller than the second threshold.

17. The circuit according to claim 12, wherein the Doppler path detecting circuit calculates a difference between every two of the phase differences to obtain a plurality of differences, and calculates the differences to obtain the number of times of a change in a phase rotation direction; the Doppler path detecting circuit determines whether the echo path is the Doppler path according to the number of times of the change in the phase rotation direction.

18. The circuit according to claim 17, wherein the Doppler path detecting circuit determines that the echo path is not the Doppler path when the number of times of the change in the phase rotation direction is greater than a third threshold.

19. The circuit according to claim 10, further comprising:

a look-up circuit, generating a setting signal according to the phase rotation frequency to an equalizer to perform parameter setting.

20. The circuit according to claim 10, further comprising:
a look-up circuit, generating a setting signal according to the phase rotation frequency to an error correcting circuit to perform parameter setting.

21. A receiver, processing an audio/video signal according to a channel state of the audio/video signal, comprising:
an estimating circuit, estimating an echo path and a reference path according to the audio/video signal, when the echo path is a Doppler path, the estimating circuit calculating a phase rotation frequency corresponding to the Doppler path according a difference between phase differences between the echo path and the reference path at two time points to generate a set of setting signals;
an equalizer, processing the audio/video signal according to the set of setting signals to generate an equalized signal; and
an error correcting circuit, performing error correction on the equalized signal according to the set of setting signal.

* * * * *